US 9,026,425 B2

(12) United States Patent
Nikoulina et al.

(10) Patent No.: US 9,026,425 B2
(45) Date of Patent: May 5, 2015

(54) LEXICAL AND PHRASAL FEATURE DOMAIN ADAPTATION IN STATISTICAL MACHINE TRANSLATION

(75) Inventors: Vassilina Nikoulina, Grenoble (FR); Stéphane Clinchant, Grenoble (FR)

(73) Assignee: Xerox Corporation, Norwalk, CT (US)

(*) Notice: Subject to any disclaimer, the term of this patent is extended or adjusted under 35 U.S.C. 154(b) by 303 days.

(21) Appl. No.: 13/596,470

(22) Filed: Aug. 28, 2012

(65) Prior Publication Data
US 2014/0067361 A1 Mar. 6, 2014

(51) Int. Cl.
*G06F 17/28* (2006.01)

(52) U.S. Cl.
CPC .................................. *G06F 17/2818* (2013.01)

(58) Field of Classification Search
CPC . G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC ........................................................ 704/2–8
See application file for complete search history.

(56) References Cited

U.S. PATENT DOCUMENTS

| | | | |
|---|---|---|---|
| 6,182,026 B1 | 1/2001 | Tillmann et al. | |
| 6,917,936 B2 | 7/2005 | Cancedda et al. | |
| 2004/0024581 A1 | 2/2004 | Koehn et al. | |
| 2004/0030551 A1 | 2/2004 | Marcu et al. | |
| 2005/0137854 A1 | 6/2005 | Cancedda et al. | |
| 2006/0190241 A1 | 8/2006 | Goutte et al. | |
| 2007/0150257 A1 | 6/2007 | Cancedda et al. | |
| 2007/0265825 A1 | 11/2007 | Cancedda et al. | |
| 2008/0052061 A1* | 2/2008 | Kim et al. ........................ | 704/4 |
| 2008/0262826 A1 | 10/2008 | Pacull | |
| 2008/0300857 A1 | 12/2008 | Barbainani et al. | |
| 2009/0083023 A1* | 3/2009 | Foster et al. ..................... | 704/3 |
| 2009/0175545 A1 | 7/2009 | Cancedda et al. | |
| 2009/0248394 A1* | 10/2009 | Sarikaya et al. .................. | 704/4 |
| 2009/0326912 A1* | 12/2009 | Ueffing ............................ | 704/2 |
| 2010/0070521 A1 | 3/2010 | Clinchant et al. | |
| 2010/0138213 A1 | 6/2010 | Bicici et al. | |

(Continued)

OTHER PUBLICATIONS

Yasuda et al, Method of Selecting Training Data to Build a Compact and Efficient Translation Model, 2008, IJCNLP, pp. 655-660.*

(Continued)

*Primary Examiner* — Lamont Spooner
(74) *Attorney, Agent, or Firm* — Fay Sharpe LLP

(57) ABSTRACT

A translation method is adapted to a domain of interest. The method includes receiving a source text string comprising a sequence of source words in a source language and generating a set of candidate translations of the source text string, each candidate translation comprising a sequence of target words in a target language. An optimal translation is identified from the set of candidate translations as a function of at least one domain-adapted feature computed based on bilingual probabilities and monolingual probabilities. Each bilingual probability is for a source text fragment and a target text fragment of the source text string and candidate translation respectively. The bilingual probabilities are estimated on an out-of-domain parallel corpus that includes source and target strings. The monolingual probabilities for text fragments of one of the source text string and candidate translation are estimated on an in-domain monolingual corpus.

24 Claims, 2 Drawing Sheets

(56) References Cited

U.S. PATENT DOCUMENTS

| | | | | |
|---|---|---|---|---|
| 2010/0179803 | A1* | 7/2010 | Sawaf et al. | 704/2 |
| 2010/0268527 | A1* | 10/2010 | Tomeh et al. | 704/4 |
| 2011/0022380 | A1* | 1/2011 | Zaslavskiy et al. | 704/4 |
| 2011/0288852 | A1* | 11/2011 | Dymetman et al. | 704/4 |
| 2012/0203539 | A1* | 8/2012 | Axelrod et al. | 704/2 |
| 2012/0209587 | A1* | 8/2012 | Tanaka et al. | 704/2 |

OTHER PUBLICATIONS

Nakov, Improving English-Spanish Statistical Machine Translation: Experiments in Domain Adaptation, Sentence Paraphrasing, Tokenization, and Recasing, 2008, ACL, pp. 147-150.*

Axelrod, et al. "Domain adaptation via pseudo in-domain data selection" Proc. of the 2011 Conference on Empirical Methods in Natural Language Processing, Assoc. for Computational Linguistics, pp. 355-362.

Bertoldi, et al. "Domain adaptation for statistical machine translation with monolingual resources", Proc. of the Fourth Workshop on Statistical Machine Translation, Mar. 30-31, 2009, p. 182-189.

"SMART Statistical Multilingual Analysis for Retrieval and Translation" The Sixth Framework Programme, Version 1.0, Sep. 24, 2007, pp. 1-52.

Foster, et al. "Discriminative instance weighting for domain adaptation in statistical machine translation" EMNLP'10, 2010, p. 451-459.

Foster, et al. "Mixture-model adaptation for smt", Proc. of the Second Workshop on Statistical Machine Translation, WMT'2007, 2007, p. 128-135.

U.S. Appl. No. 13/479,648, filed May 24, 2012, Nikoulina, et al.

U.S. Appl. No. 13/173,582, filed Jun. 30, 2011, Nikoulina, et al.

Haque, et al. "Experiments on domain adaptation for English-hindi smt", PACLIC 23: the $23^{rd}$ Pacific Asia Conf. on Language, Information and Computation 2009, p. 660-677.

Hildebrand, et al. "Adaptation of the translation model for statistical machine translation based on information retrieval", Proc. of the $10^{th}$ Conf. of the European Assoc. for Machine Translation, 2005, p. 133-142.

Jiang, et al. "Instance weighting for domain adaptation in nlp", ACL 2007, 2007, p. 264-271.

Koehn, et al. "Experiments in domain adaptation for statistical machine translation", Proc. of the Second Workshop on Statistical Machine Translation, StatMT'07, pp. 224-227.

Pecina, et al. "Towards using web-crawled data for domain adaptation in statistical machine translation", Proc. of the $15^{th}$ Annual Conf. of the European Assoc. for Machine Translation, 2011, p. 297-304.

Wu, et al. "Domain adaptation for statistical machine translation with domain dictionary and monolingual corpora" Proc. of the $22^{nd}$ Intl. Conf. on Computation Linguistics, (Coling2008), 2008, p. 993-100.

Xu, et al. "Domain dependent statistical machine translation" Machine Translation Summit, 2007, p. 515-520.

Zhao, et al. "Language Model adaptation for statistical machine translation with structured query models" Proc. of the $20^{th}$ Intl. Conf. on Computational Linguistics COLING'04, p. 1-7.

Koehn, et al. "Moses: Open Source Toolkit for Statistical Machine Translation", Proc. of the ACL 2007 Demo and Poster Sessions Jun. 2007, p. 177-180.

Papineni, et al. "BLEU: a method for automatic evaluation of machine translation" ACL-2002: $40^{th}$ Annual meeting of the ACL. p. 311-318.

Snover, et al. "A study of translation edit rate with targeted human annotation" Proc. $7^{th}$ Conf. Assoc. for Machine Translation in the Americas, 2006, pp. 223-231.

Clinchant, et al. "XRCE's Participation to CLEF 2007 Domain-specific Track", Working notes of CLEF 2007, p. 1-15.

\* cited by examiner

LEXICAL AND PHRASAL FEATURE DOMAIN ADAPTATION IN STATISTICAL MACHINE TRANSLATION

BACKGROUND

The exemplary embodiment relates to statistical machine translation and finds particular application in connection with a translation system and method which considers potential ambiguity in the target domain.

Statistical Machine translation (SMT) systems are widely used for translation of text from a source language to a target language. The systems often include a model that has been trained on parallel corpora, that is on pairs of sentences in the source and target language that are known or expected to be translations of each other. Large corpora are used for training the system to provide good translation performance. For example, text of the European Parliament, which is often translated into several languages, has been widely used as source and target corpora. Such corpora tend to be domain specific. Since the translation models in SMT rely heavily on the data they have been trained on, they may not provide as good performance outside that domain. Thus, for example, a model trained on the Europarl data is likely to provide weaker performance when translating texts in a medical or agricultural domain.

There are several reasons for this. First, some terms specific to the domain may be missing in the training corpus. Second, even if the correct translation is present, the wrong translation may be promoted by the translation model. Thus, the English-French translation (house, assemblee) is more probable (0.5) in the model trained on Europarl than (house, maison) (0.48). Third, the sentence structure of new domain (e.g., in the case of patents or a travel guide) may be different from the style of the parallel corpus available (e.g., parliamentary speeches). The problem may thus include not only the lexical translation adaptation, but also "structure" adaptation.

While some of these problems could be addressed by having a large training corpus of in-domain parallel text and/or parallel in-domain terminology, this may not be available. The parallel resources are often rare and expensive to produce. Further, the cost of training translation systems for use in many different domains would be high. The domain adaptation of translation models is thus an issue in Statistical Machine Translation.

When a parallel in-domain corpus is available for training an SMT model, several approaches have been proposed or domain adaptation. In the instance weighting approach (see, G. Foster, C. Goutte, and R. Kuhn, Discriminative instance weighting for domain adaptation in statistical machine translation," in Proc. 2010 Conf. on Empirical Methods in Natural Language Processing, EMNLP '10, pages 451-459, Association for Computational Linguistics (ACL), 2010), where the out-of-domain phrase-pairs are weighted according to their relevance to the target domain. The weighting scheme proposed in Foster is based on the parallel in-domain corpus. A similar framework to that proposed by J. Jiang and C. Zhai ("Instance weighting for domain adaptation in NLP," in ACL 2007, pages 264-271, 2007) is proposed for adaptation using source monolingual in-domain corpus. However, this has only been applied for Named Entity Recognition and PoS tagging tasks. While Foster's adaptation operates at the phrase level, other approaches operate at the feature-level. Examples of these are mixture models (see, G. Foster and R. Kuhn, "Mixture-model adaptation for SMT," in Proc. 2nd Workshop on Statistical Machine Translation, WMT'2007, pages 128-135, ACL 2007) and tuning on an in-domain development set (see P. Pecina, A. Toral, A. Way, V. Papavassiliou, P. Prokopidis, and M. Giagkou, "Towards using web-crawled data for domain adaptation in statistical machine translation, in Proc. 15th Annual Conf. of the European Assoc. for Machine Translation, pages 297-304, Leuven, Belgium, 2011).

In the case where there is no in-domain parallel data to train a dedicated translation one approach has been to create artificial parallel data. It has been suggested that pseudo indomain data could be selected from large out-of-domain available corpus (parallel and/or monolingual) using information retrieval, clustering or classification, or cross-entropy methods (see, A. S. Hildebrand, M. Eck, S. Vogel, and A. Waibel, "Adaptation of the translation model for statistical machine translation based on information retrieval," in Proc. 10th Conf. of the European Association for Machine Translation (EAMT), Budapest, May 2005; B. Zhao, M. Eck, and S. Vogel, "Language model adaptation for statistical machine translation with structured query models," in Proc. 20th Intern'l Conf. on Computational Linguistics, COLING '04. ACL 2004; R. Hague, S. K. Naskar, J. V. Genabith, and A. Way, "Experiments on domain adaptation for English—Hindi SMT," in Proc. of PACLIC 23: the 23rd Pacific Asia Conference on Language, Information and Computation, 2009; J. Xu, Y. Deng, Y. Gao, and H. Ney, "Dependent statistical machine translation," in Machine Translation Summit, Copenhagen, Denmark, 2007; A. Axelrod, X. He, and J. Gao, "Domain adaptation via pseudo in-domain data selection," in Proc. 2011 Conf. on Empirical Methods in Natural Language Processing, pp. 355-362, Edinburgh, Scotland, 2011. The "pseudo" in-domain corpus is then used in a combination with an out-of-domain corpus for creating an adapted translation model. It has been suggested that the translation model trained on thus selected "pseudo" in-domain corpus (representing 1% of the whole corpus) might outperform a translation model trained on a whole corpus. This may be due to the lexical ambiguity problem existing in the whole corpus. These approaches, however, do not address the domain adaptation problem directly with an available in-domain monolingual corpus, but rather search for a way to create an artificial in-domain parallel corpus. These methods generally create an in-domain Language Model.

Another approach creates artificial in-domain parallel data by translating source/target monolingual data with a previously trained out-of-domain translation model (see, N. Bertoldi and M. Federico, "Domain adaptation for statistical machine translation with monolingual resources," in Proc. 4th Workshop on Statistical Machine Translation, pages 182-189, ACL 2009. The in-domain and out-of-domain corpora came from a similar domain (United Nations and Europarl) and may not be representative of many of the situations faced (e.g., parliamentary speeches vs. medical text).

INCORPORATION BY REFERENCE

The following references, the disclosures of which are incorporated herein by reference in their entireties, are mentioned:

Cross-lingual information retrieval methods are disclosed in U.S. application Ser. No. 13/479,648, filed on May 24, 2012, entitled DOMAIN ADAPTATION FOR QUERY TRANSLATION, by Vassilina Nikoulina, Nikolaos Lagos, and Stephane Clinchant; U.S. application Ser. No. 13/173, 582, filed Jun. 30, 2011, entitled TRANSLATION SYSTEM ADAPTED FOR QUERY TRANSLATION VIA A RERANKING FRAMEWORK, by Vassilina Nikoulina, et al.; and U.S. Pub. No. 20100070521, published Mar. 18, 2010, entitled QUERY TRANSLATION THROUGH DICTIONARY ADAPTATION, by Stephane Clinchant, et al.

Phrase based machine translation systems are disclosed, for example, in U.S. Pat. No. 6,182,026 entitled METHOD AND DEVICE FOR TRANSLATING A SOURCE TEXT INTO A TARGET USING MODELING AND DYNAMIC PROGRAMMING, by Tillmann, et al., U.S. Pub. No. 2004/0024581 entitled STATISTICAL MACHINE TRANSLATION, by Koehn, et al., U.S. Pub. No. 2004/0030551 entitled PHRASE TO PHRASE JOINT PROBABILITY MODEL FOR STATISTICAL MACHINE TRANSLATION, by Marcu, et al., U.S. Pub. No. 2008/0300857, published Dec. 4, 2008, entitled METHOD FOR ALIGNING SENTENCES AT THE WORD LEVEL ENFORCING SELECTIVE CONTIGUITY CONSTRAINTS, by Madalina Barbaiani, et al.; U.S. Pub. No. 2006/0190241, published Aug. 24, 2006, entitled APPARATUS AND METHODS FOR ALIGNING WORDS IN BILINGUAL SENTENCES, by Cyril Goutte, et al.; U.S. Pub. No. 2007/0150257, published Jun. 28, 2007, entitled MACHINE TRANSLATION USING NON-CONTIGUOUS FRAGMENTS OF TEXT, by Nicola Cancedda, et al.; and U.S. Pub. No. 2007/0265825, published Nov. 15, 2007, entitled MACHINE TRANSLATION USING ELASTIC CHUNKS, by Nicola Cancedda, et al.

BRIEF DESCRIPTION

In accordance with one aspect of the exemplary embodiment, a translation method adapted to a domain of interest includes receiving a source text string comprising a sequence of source words in a source language. A set of candidate translations of the source text string is generated. Each candidate translation includes a sequence of target words in a target language. An optimal translation is identified from the set of candidate translations as a function of at least one domain-adapted feature. The at least one domain-adapted feature is computed based on a combination of bilingual probabilities and monolingual probabilities. Each bilingual probability is for a source text fragment and a target text fragment of the source text string and candidate translation respectively. The bilingual probabilities are estimated on an out-of-domain parallel corpus comprising source and target strings. The monolingual probabilities are for text fragments of one of the source text string and candidate translation. The monolingual probabilities are estimated on an in-domain monolingual corpus.

In another aspect, a translation system adapted to a domain of interest includes memory which stores a bilingual probability for each of a set of biphrases estimated on an associated out-of-domain parallel corpus comprising source and target strings, each biphrase comprising a text fragment in the source language and a text fragment in a target language. A monolingual probability is also stored for each of a set of text fragments estimated on an associated in-domain monolingual corpus, each of the text fragments occurring in at least one of the biphrases in the set of biphrases. Memory stores a candidate translation generator for generating a set of candidate translations of a source text string, the source string comprising a sequence of source words in a source language, each candidate translation comprising a sequence of target words in a target language. A translation evaluation component is provided for identifying an optimal translation from the set of candidate translations as a function of at least one domain-adapted feature, the at least one domain-adapted feature being computed based on respective bilingual probabilities for source and target text fragments of the source text string and candidate translation and monolingual probabilities for respective text fragments of at least one of the source text string and candidate translation. A processor executes the instructions.

In another aspect, a method for adapting a machine translation system for a domain of interest includes providing a biphrase library comprising a set of biphrases, each biphrase comprising a source text fragment in a source language and a target text fragment in a target language, the biphrases being associated with bilingual probabilities estimated on a parallel corpus of text strings in the source and target languages. A first monolingual corpus for the domain of interest is provided which includes text strings in one of the source language and target language. A monolingual text fragment probability for each of a set of text fragments found in the biphrase library in the one of the source language and target language, is estimated on the first monolingual corpus. Weights are generated for features of a scoring function, at least one of the features being a domain-adapted feature that is to be computed based on bilingual probabilities retrieved from the biphrase library, each bilingual probability being for a source text fragment and a target text fragment of a source text string and candidate translation respectively, and monolingual probabilities for text fragments of one of the source text string and candidate translation, the monolingual probabilities being drawn from the computed monolingual probabilities for the set of text fragments.

DETAILED DESCRIPTION

Aspects of the exemplary embodiment relate to a system and method for statistical machine translation which are adapted to a particular domain, in which words and phrases differ in their lexical and phrasal probabilities from a parallel corpus that is available for training.

The exemplary system and method find particular application in cases where large parallel corpora (generic or diverse domains) are available, as well as a substantial in-domain monolingual corpus. The exemplary system and method may be applicable in the case when small amount of parallel in-domain corpora is available or when none is available. Domain adaptation is of significant value for SMT. While conventional techniques for domain adaptation of SMT models rely on the presence of in-domain parallel corpora, in practice, there is rarely a sufficient amount of parallel in-domain corpora available. The exemplary method allows monolingual in-domain data, which is much easier to find (e.g., by focused web crawling, exploring Wikipedia categories, etc.), to be utilized in the task, resulting in significant improvements without a high cost.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

A "text fragment," as used herein, refers to a word or phrase of a text string comprising a sequence of such words/phrases.

Figure 1:
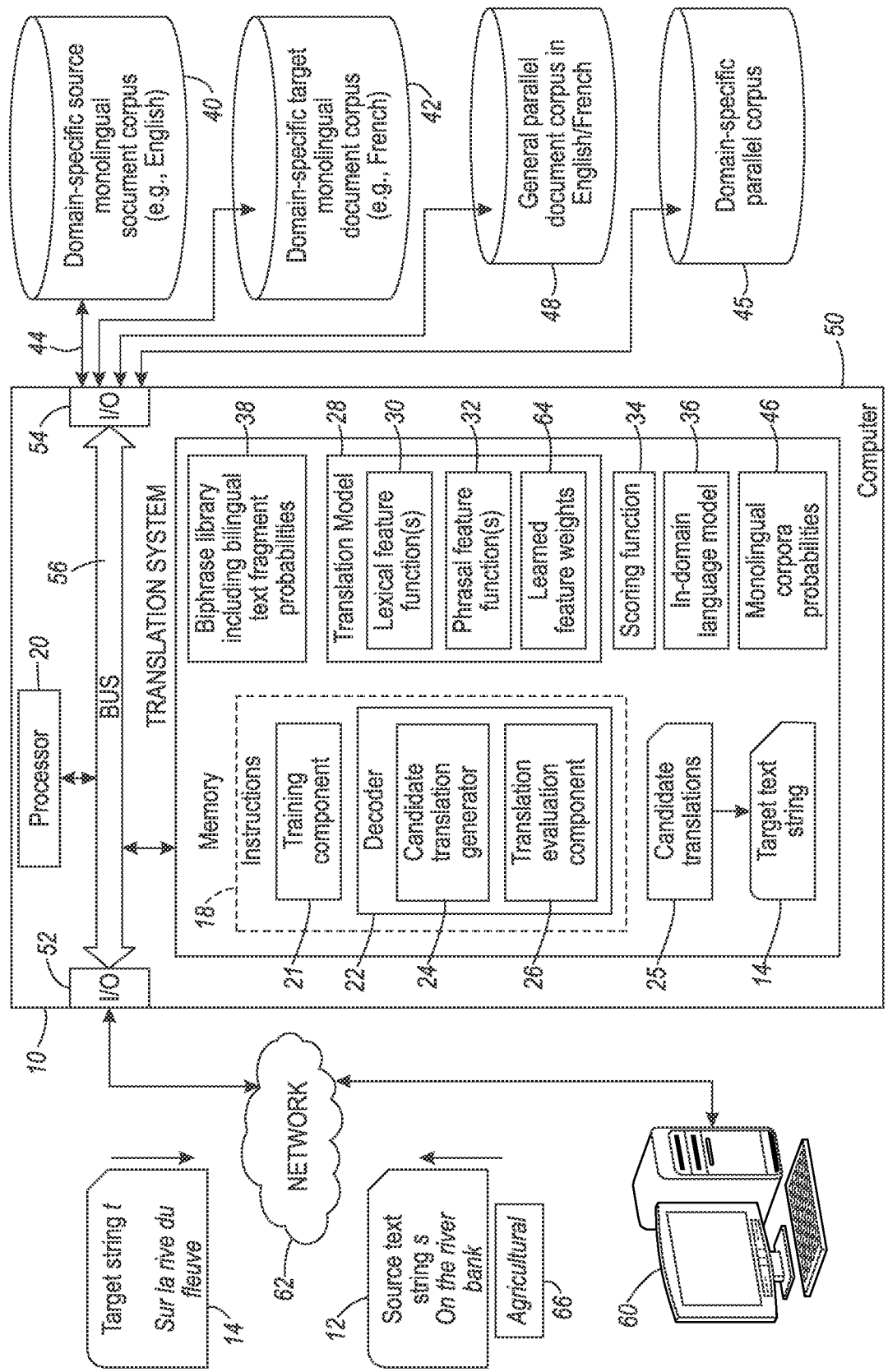
FIG. 1 is a functional block diagram of a domain-adapted translation system.

With reference to FIG. 1, an exemplary domain-adapted translation system 10 in accordance with one aspect of the exemplary embodiment is shown. The system 10 is adapted to receiving source text 12 in a first natural language (source language), such as English, and outputting target text 14 in a second natural language (target language) different from the first natural language, such as French (in the examples). The source text includes one or more text strings, such as sentences. For each source text string, a corresponding target text string is selected from a set of possible translations based on computed domain-adapted features and associated weights.

The system 10 includes memory 16 which stores instructions 18 for performing the exemplary method(s) described herein and a processor 20 in communication with the memory 16 for executing the instructions. The exemplary instructions include a training component 21 and a decoder 22. The training component 21 adapts the system 10 from a generic SMT system to one which is more appropriate to a domain of interest, as described below. The decoder 22 includes a candidate translation generator 24 and a translation evaluation component 26. The candidate translation generator 24 generates candidate translations 25 of phrases of a text string (or an entire sentence). The translation evaluation component 26 inputs the candidate translations uses a translation model 28 to compute features used to score the candidate translations. The purpose of the translation model 28 is to compute the probability that the target string is the translation of the source string. The translation model 28 computes features, such as lexical and phrasal probabilities (collectively, text fragment probabilities) for the candidate translations using a set of feature functions. These include domain-adapted feature functions 30, 32. The evaluation component 26 uses a scoring function 34 to compute a score for each of at least a plurality of the candidate translations 25, based on the features output by the translation model 28. In particular, the scoring function 34 aggregates the computed features, including the computed domain-adapted features output by the domain-adapted feature functions 30, 32, to provide a score for the candidate translation. The scoring function 34 may optionally aggregate other translation scoring measures into the overall score, such as a language model 36. The translation evaluation component 26 of the system 10 outputs one or more of the top scoring translations as the translation(s) 14 of the sentence.

The decoder 22, as is conventionally used in a phrase-based statistical machine translation (SMT) system, has access to a biphrase library 38 which stores source-target phrase pairs. The decoder 22 identifies a candidate translation 25 by mapping ones of the biphrases to words of the source string such that each word is covered by at most one biphrase. Each biphrase includes one or more words in the source language and one or more words in the target language. In this way, a set of candidate translations is generated with different combinations of biphrases.

As will be appreciated, the candidate translations 25 that are evaluated need not initially be for an entire sentence 14. The system may work on text strings that are only fragments of the sentence, eliminating the poorly scoring candidate translations, and gradually building a candidate translation for the entire source sentence.

The system 10 also has access to at least one of a first monolingual corpus 40 of documents (or sentences extracted from them) comprising documents solely or predominantly in the source language and a second monolingual corpus 42 of documents comprising documents (or sentences extracted from them) solely or predominantly in the target language. In general, the monolingual corpora 40, 42 are not used in computing the biphrases in the library 38, since the first corpus 40 contains only source language documents and has no identified matching target language documents. Similarly, the second corpus 42 contains only target language documents and has no identified corresponding source language documents.

The exemplary document collections 40, 42 are domain-specific document collections, i.e., collections in which the documents in the collection predominantly relate to a specific domain of interest. For example, the domain may be medical, e.g., healthcare related, scientific, legal, e.g., litigation, cultural, agricultural, or more specific, such as a collection of documents relating to works of art.

In one embodiment, the system 10 does not use or have access to any domain-specific parallel corpora in training of the translation model or generation of the statistics for the biphrase library. In another embodiment, only a small sample of in-domain parallel data (i.e., an in domain parallel corpus) is available. For example, an in-domain parallel corpus 45 may be generated which has less than 10% of the number of out-of-domain sentence pairs, or less than 1%. As an example, 500-10,000 parallel sentences may be generated for an in-domain parallel corpus. These sentences may be manually generated or extracted from available documents in the source and target languages that are determined to be translations from one to the other. This small in-domain parallel corpus may be used for optimization of the translation models' parameters (weights).

The documents in each monolingual corpus 40, 42 are domain specific in that they relate generally to the domain of interest. Such documents may have been identified by crawling the web using search parameters related to the domain of interest to identify text in the documents responsive to the search parameters. Alternatively, they may be drawn from a library of documents in the domain of interest, such as a database of scientific or other domain-related publications, patent documents, technical manuals, or the like, depending on the domain of interest. Each monolingual corpus 40, 42 may be stored in memory 16 of the system or in remote memory accessible by a wired or wireless link 44.

Statistics 46 extracted from the monolingual corpora 40, 42 may be stored in system memory 16 or in external memory accessible to the system. These statistics 46 may include text fragment probabilities (word and phrase probabilities) computed as frequencies of occurrence of words and phrases found in the respective monolingual corpora, in particular, the frequencies of those text fragments which are found in the biphrase library 38. For example, if the biphrase library includes (river bank, rive du fleuve) as one of the biphrases, the statistics may include the frequency of occurrence of rive du fleuve in the corpus 42 and the frequency of occurrence of river bank in the corpus 40 as well as single word frequencies, such as the frequencies of river and bank. The frequency of occurrence of a word or longer phrase may be expressed as a count (total number of occurrences) or as a function of the total number of occurrences and the total number of words in the respective monolingual corpus, e.g., as a ratio of the two.

The biphrases (i.e., text fragment pairs) in the biphrase library 38 may have been extracted from a generic parallel corpus 48 of parallel sentences (translation pairs) obtained from documents in the source and target languages and may be associated with respective probabilities representing their frequencies of occurrence of each biphrase in the parallel corpus. The biphrases may be n-grams, where n is at least 2, at least on the source side. e.g., bigrams or trigrams. Methods for building parallel corpora from which biphrase libraries can be generated are disclosed, for example, in U.S. Pub No. 2008/0262826, published Oct. 23, 2008, entitled METHOD FOR BUILDING PARALLEL CORPORA, by Francois Pacull. Methods for filtering bi-phrases are disclosed in U.S.

patent application Ser. No. 12/427,149, filed on Apr. 21, 2009, entitled BI-PHRASE FILTERING FOR STATISTICAL MACHINE TRANSLATION, by Marc Dymetman, et al. In general, the generic parallel corpus 48 is a corpus that is not dedicated to documents in a domain of interest.

The biphrase library 38 may also store computed values of one or more features of the biphrase, such as phrasal probabilities, i.e., the probability of finding a source phase and target phrase in a translation pair of sentences within the parallel corpus 48, and vice versa, as well as lexical probabilities, which may be computed as a function of the probability of finding, within the parallel corpus 48, a word of the source phrase in a translation pair that includes its most probable corresponding target word in the target phrase. The biphrase library 38 need not be stored in the form of a table but can be stored in computer memory in any suitable accessible data structure. Thus, for example, the features stored in the biphrase library 38 may include the phrasal probability of finding river bank, rive du fleuve in translation pairs and the lexical probability for bank, rive in corresponding translation pairs in the corpus, as well as the corresponding reverse probabilities for rive du fleuve, river bank and rive, bank. As will be appreciated, in a parallel corpus 48 such as that comprising documents of the European parliament, the lexical probability for rive, bank is likely to be lower than for the bank, banque, thus making it less likely to be used in translations where no domain adaptation is employed.

The biphrase library 38 may be generated in any suitable manner as known in the art. For example, it may be extracted from the parallel corpus 48 by the heuristics employed in a standard run of the Moses pipeline (see, P. Koehn, H. Hoang, A. Birch, C. Callison-Burch, M. Federico, N. Bertoldi, B. Cowan, W. Shen, C. Moran, R. Zens, "Moses: Open Source Toolkit for Statistical Machine Translation," Proceedings of the ACL 2007 Demo and Poster Sessions, pages 177-180 (June 2007)). In such a method, the biphrase library 38 is often obtained by first aligning a parallel corpus 48 at the level of the individual words. This alignment often relies on a tool called GIZA++. GIZA++ is a statistical machine translation toolkit that is used to train IBM statistical translation models (Models 1-5) and an HMM word alignment model. A further procedure then extracts phrase pairs (bi-phrases) and inserts them in the biphrase table, together with the appropriate corpus-wide frequency statistics.

In the exemplary embodiment, the translation component 26 utilizes the translation scoring function 34 to compute a translation score $S_t$ for a candidate translation t of the source string based on the translation model 28. The optimum translation $\hat{t}$ is the one which maximizes the translation score $S_{\hat{t}}$, over all translations t in the set 25 of candidate translations. The translation score $S_t$ can be defined as a function of values of a set of features, each feature being weighted by a respective weight. As an example, the translation score $S_t$ may be a function of a weighted linear combination of the values of the set of features. In one embodiment, the optimum translation $\hat{t}(s)$ of a source string (sentence or phrase) s is the solution of the scoring function, which may be represented by the following equation:

$$\hat{t} = \mathrm{argmax}_t \sum_k \lambda_k \Phi_k(s, t) \quad (1)$$

where $\Phi_k(s,t)$ represent computed feature values for a set of k feature functions and $\lambda_k$ are the respective weights of the feature functions. Equation 1 simply identifies the translation $\hat{t}$, of a set of translations t considered, which gives the optimum (e.g., highest) score overall, for the set of weighted feature functions. In the case where $\hat{t}$ is a phrase corresponding to part of an input text string, the optimal translation of a source sentence may be computed as a combination of the optimal phrase translations for the source phrases which compose the source sentence.

The weights $\lambda_k$ may be optimized on a development set of source/target text strings to optimize (e.g., maximize) a suitable translation scoring metric, such as the BLEU score. See, Papineni, K., Roukos, S., Ward, T., and Zhu, W. J, "BLEU: a method for automatic evaluation of machine translation" in ACL-2002: 40th Annual meeting of the ACL, pp. 311-318. Another translation scoring metric is the TER (Translation Error Rate). See Matthew Snover, Bonnie Dorr, Richard Schwartz, Linnea Micciulla, and John Makhoul, "A Study of Translation Edit Rate with Targeted Human Annotation," Proc. Assoc. for Machine Translation in the Americas, 2006. Other methods for evaluating the quality of machine translation are disclosed, for example, in U.S. Pub. No. 2005/0137854, published Jun. 23, 2005, entitled METHOD AND APPARATUS FOR EVALUATING MACHINE TRANSLATION QUALITY, by Nicola Cancedda, et al., and U.S. Pat. No. 6,917,936, issued Jul. 12, 2005, entitled METHOD AND APPARATUS FOR MEASURING SIMILARITY BETWEEN DOCUMENTS, by Nicola Cancedda; and U.S. Pub. No. 20090175545, published Jul. 9, 2009, entitled METHOD FOR COMPUTING SIMILARITY BETWEEN TEXT SPANS USING FACTORED WORD SEQUENCE KERNELS, by Nicola Cancedda, et al, the disclosures of which are incorporated herein by reference. In some embodiments, a small in-domain parallel corpus 45 (development set) comprising source/target translation pairs may be provided for turning of the in-domain feature weights 64. This corpus 45 may be used on its own or in combination with out-of-domain translation pairs.

In the exemplary embodiment, one of the domain-adapted feature functions 30 in the set $\Phi_k(s,t)$ captures lexical features of the source and target string and another of the domain-adapted feature functions 32 captures phrasal features of the source and target string. One or both of these feature functions 30, 32 may be adapted to capture domain specific features, as described below.

The exemplary translation system 10 is resident on one or more computing devices 50 and includes one or more input/output (I/O) devices 52, 54 for communicating with external devices. Hardware components 16, 20, 52, 54 of the system 10 may be communicatively linked via a data/control bus 56.

The input source text 12 can be input to the system 10 in any suitable form, e.g., from a client device 60, connected with the system 10 via a wired or wireless link 62, such as a wired connection, local area network, or wide area network, such as the Internet. In other embodiments, the source text 12 is input to the system from a memory storage device, such as a disk or memory stick, or is generated within the system 10, itself. In some embodiments, where the system 10 is configured for translation suited to more than one domain, the user may be asked to select a domain for the translation from a predetermined set of two or more proposed domains. In some embodiments, rather than outputting the translated text 14, the system may output information based thereon. For example, where the text string is a query, information retrieval may be performed with the translated query 14 and the information output may be in the form of responses to the query, such as a set of responsive target language documents.

The computer device 50 may be a PC, such as a desktop, a laptop, palmtop computer, portable digital assistant (PDA), server computer, cellular telephone, tablet computer, pager, combination thereof, or other computing device capable of executing instructions for performing the exemplary method. In some cases, software components may be wholly or partly resident on the client computing device.

The memory 16 may represent any type of non-transitory computer readable medium such as random access memory (RAM), read only memory (ROM), magnetic disk or tape, optical disk, flash memory, or holographic memory. In one embodiment, the memory 16 comprises a combination of random access memory and read only memory. Memory 16 stores instructions for performing the exemplary method as well as the processed data. In some embodiments, the processor 20 and memory 16 may be combined in a single chip. The exemplary network interface 52, 54 allows the computer to communicate with other devices via a computer network and may comprise a modulator/demodulator (MODEM).

The digital processor 20 can be variously embodied, such as by a single-core processor, a dual-core processor (or more generally by a multiple-core processor), a digital processor and cooperating math coprocessor, a digital controller, or the like. The digital processor 20, in addition to controlling the operation of the computer 50, executes instructions stored in memory 16 for performing the method outlined in FIG. 2.

Client device 60 may be configured similarly to the computer 50, i.e., with memory, a processor, and one or more interfaces for communicating with external devices.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
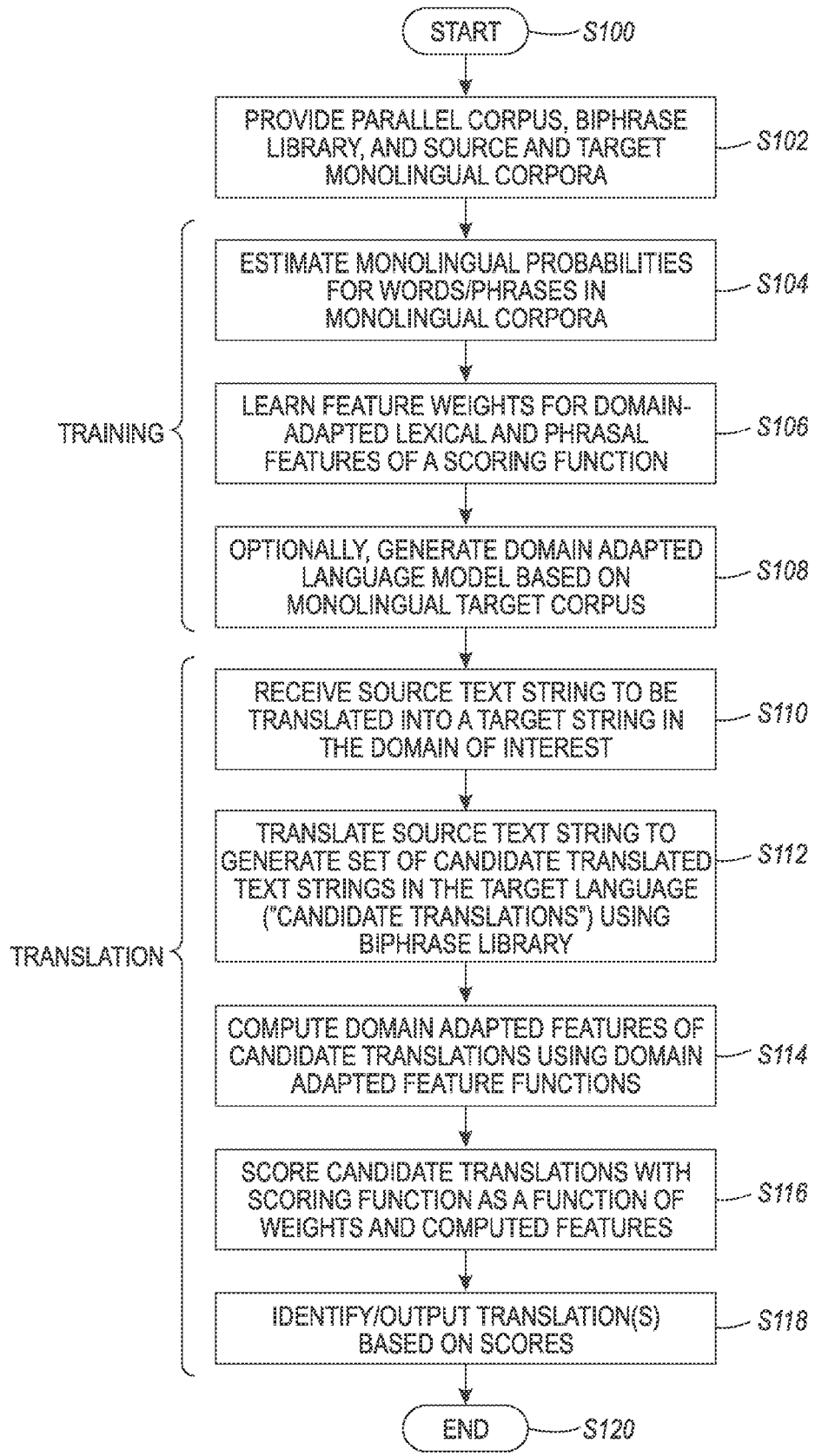
FIG. 2 is a flow diagram of a domain-adapted translation method.

FIG. 2 illustrates an exemplary method which includes a training stage and a translation stage. The training stage may be performed by the training component 21. As will be appreciated, the training stage may be separate from the translation stage and the training stage may be performed on a separate computing device from the translation stage. The method begins at S100.

At S102, a parallel out-of-domain corpus 48 is provided, together with monolingual in domain source and target corpora 40, 42. A small in-domain parallel corpus 45 may also be provided for learning in-domain feature weights 64 in the translation model 28.

At S104, in-domain monolingual probabilities 46 are estimated for a set of words and/or phrases found in the in-domain monolingual corpora 40, 42 and are stored in memory 16. It is assumed that bilingual probabilities for these words/phrases have already been computed as part of the training of the standard machine translation system and stored in the biphrase library 38.

At S106, feature weights 64 are learned/generated for the lexical and/or phrasal features to be used in the scoring function 34, and stored in memory. Where an in-domain parallel corpus 45 is available, these weights may be learned at least in part on that corpus. Otherwise the weights may be derived from those generated for an out-of-domain corpus, for example by splitting weights generated for out-of-domain features between the in and out-of-domain corresponding features or, where only the in-domain features are used, replacing them. The split may be an equal split or may be biased in favor of the in or out-of-domain feature, depending on the observed translation quality.

At S108, a language model 36 adapted to the domain of interest may be generated using, at least in part, the in-domain target monolingual corpus 42, and stored in memory. Once the training stage is completed, the training component 21 is no longer needed and may be omitted from the system 10. Additionally, access to the various corpora 40, 42, 45, 48 need no longer be provided.

At S110, in the translation stage, source text 12 in the domain of interest is received, optionally together with a label 66 specifying its domain selected from a set of domain labels, e.g., via a GUI on the client device. The source text may include one or more text strings, such as sentences.

At S112, for each text string in turn, candidate translations 25 are generated for the text string, by the decoder candidate translation generator 24. Any suitable method can be used for this step, see for example, U.S. Pub. No. 20100138213 and references cited therein, the disclosures of which are incorporated herein by reference.

At S114, domain adapted (and other) features for at least a set of these candidate translations 25 are computed.

At S116, the candidate translations 25 are scored, by the translation evaluation component 26, using a scoring function 34 which takes into account the computed domain-adapted features and their learned or otherwise generated feature weights 64. As will be appreciated, steps S112 to S116 may be iterative, such that the text string is progressively built from text fragments.

At S118, an optimal one (or more) of the candidate translations (based on the cores computed with the scoring function) may be output as the translation 14 of the source sentence. In other embodiments, the candidate translations may be ranked based on their scores and/or one or more of the most highly ranked may be used for cross language retrieval (i.e., retrieval of information in the target language)

The method ends at S120.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the exemplary training and/or translation method.

As will be appreciated, the steps of the method need not all proceed in the order illustrated and fewer, more, or different steps may be performed.

Further details of the system and method will now be provided.

The exemplary translation model 28, in the case of phrase-based SMT includes both the lexical and phrasal feature functions 30, 32 for computing lexical and phrasal features adapted to the domain of interest, although in other embodiments, only one of these may be employed. The following description provides example functions for computing conventional lexical and phrasal features and how these may be adapted to provide domain-adapted feature functions.

1. Lexical Features

These may include direct and/or inverse lexical probabilities lex($\bar{s}|\bar{t}$), lex($\bar{t}|\bar{s}$). These probabilities reflect how well the source sentence corresponds to the target sentence at the word level.

A. Generic Lexical Feature Functions

In the case of a conventional translation model (without the exemplary domain adaptation), lexical features may be computed in the following way:

Let $\bar{s}=s_1 \ldots s_k$ be a source sentence or part thereof (e.g., a phrase) in which $s_1$, $s_2$, etc. represent a sequence of text fragments (words, in this case), $\bar{t}=t_1 \ldots t_l$ be a target sentence or part thereof, in which $t_1$, $t_2$ etc. represent its text fragments (words in this case), and let a be the word-level alignment between $\bar{s}$ and $\bar{t}$.

The phrases that are aligned are drawn from the biphrase library. The alignment may be computed based on the set of biphrases which have been selected to cover the source and target phrases, respectively. In a Viterbi alignment, the biphrases are not permitted to overlap each other, and each word of the target sentence and each word of the source sentence is in exactly one biphrase (assuming that the word is known in the parallel corpus and present in the biphrase library 38), although more flexible approaches are also contemplated. Within each aligned pair of phrases, a word-level alignment is generated. See, for example, U.S. Pub. Nos. 20080300857, 20100138213, and 20110288852 and references cited therein, the disclosures of which are incorporated herein by reference.

Then the direct lexical probability is computed according to the lexical feature function 30:

$$lex(\bar{s}|\bar{t}) = \prod_{i=1}^{n} \frac{1}{|\{j | (i, j) \in a\}|} \sum_{(i,j)\in a} w(s_i | t_j) \quad (2)$$

where n is the number of words in the source string (or phrase)

the word probability $$w(s_i | t_j) = \frac{c(s_i, t_j)}{A},$$

$c(s_i,t_j)$ is the number of times that words $s_i$ and $t_j$ co-occur in the parallel corpus 46 (meaning that they occur in a bi-sentence and the words themselves are aligned with each other) and $|\{j|(i,j)\in a\}|$ is the number of target words $t_j$ aligned to the source word $S_1$.

A is a normalizing factor which can be of the form $\Sigma_k c(s_k, t_j)$ which represents the sum, over all source words $s_k$ which co-occur with the target word $t_j$.

According to Eqn. (2), therefore, the direct lexical probability is thus computed as the product, for all words in the source string (or phrase), of the sum of the word probabilities, over all words i and j that are aligned with each other in the source and candidate target sentences. The word probability is the (normalized) number of times (or frequency) that the source word $s_i$ is found in a source sentence which has been aligned in the parallel corpus with a target sentence which includes the target word $t_j$. The counts $c(s_i,t_i)$ and $c(t_j,s_i)$ can be precomputed and stored as statistics in memory, such as in the biphrase library 36.

As will be appreciated, the reverse lexical probabilities can be computed according to:

$$lex(\bar{t}|\bar{s}) = \prod_{j=1}^{n} \frac{1}{|\{i | (i, j) \in a\}|} \sum_{(i,j)\in a} w(t_j | s_i) \quad (3)$$

B. Domain-Adapted Lexical Feature Functions

In one embodiment, the lexical probabilities adaptation proceeds as follows. The generic (out-of-domain) lexical features can be transformed into corresponding 'in-domain' forward and reverse lexical features applying a Bayesian rule to decompose the direct and reverse probabilities. An example of this decomposition for the direct conditional probability can be as follows:

$$w_{in}(s_i | t_j) = \frac{w_{out}(t_j | s_i) w_{in}(s_i)}{\sum_k w_{out}(t_j | s_k) w_{in}(s_k)} \quad (4)$$

Extended variation of Bayes theorem applied to $w_{in}(t_j)$ gives:

$$w_{out}(t_j) = \sum_{s_k} w_{out}(t_j | s_k) w_{out}(s_k) \quad (5)$$

Equation (4) combined with the equation (5) gives:

$$w_{out}(s_i | t_j) = \frac{w_{out}(t_j | s_i) w_{out}(s_i)}{\sum_{s_k} w_{out}(t_j | s_k) w_{out}(s_k)} \quad (6)$$

Equation (6) indicates that the conditional probability is dependent on the monolingual source and target probability and bilingual reverse conditional probability. An assumption can be made that the bilingual distribution will be similar between different domains, but the monolingual distribution of words will change. Thus, the in-domain conditional probability $w_{in}(s_i|t_j)$ will be obtained by replacing monolingual out probabilities $w_{out}(s_i)$ by in-domain distribution functions $w_{in}(s_i)$, which leads to the following equation:

$$w_{in}(s_i \mid t_j) = \frac{w_{out}(t_j \mid s_i) w_{in}(s_i)}{\sum_{s_k} w_{out}(t_j \mid s_k) w_{in}(s_k)} \quad (7)$$

Applying the same transformations to the reverse conditional probability gives:

$$w_{in}(t_j \mid s_i) = \frac{w_{out}(s_i \mid t_j) w_{in}(t_j)}{\sum_{t_l} w_{out}(s_i \mid t_l) w_{in}(t_l)}, \quad (8)$$

where $w_{in}(s_i)$ and $w_{in}(t_j)$ are the in-domain, monolingual (unigram) word probabilities 44 estimated on the respective monolingual in-domain corpus 40, 42. These can each be a count of the number of occurrences of the word in the respective in-domain monolingual corpus, optionally divided by a count of the number of words in the monolingual corpus, and can be prestored in memory.

$w_{out}(s_i|t_j)$ and $w_{out}(t_j|s_i)$ are the bilingual, generic (unigram) word probabilities $w(s_i|t_j)$ and $w(t_j|s_i)$ estimated on the general parallel corpus, as described above for Eqns. (2) and (3). The in-domain word probabilities $w_{in}(t_j)$ and $w_{in}(s_i)$ 44 need only be computed for those source and target words which have a non-zero out-of-domain word probability, i.e., which are found in at least a threshold frequency in the parallel corpus 46 (or which are present in the biphrase library).

The denominators $$\sum_k w_{out}(t_j \mid s_k) w_{in}(s_k)$$

and $$\sum_l w_{out}(s_i \mid t_l) w_{in}(t_l)$$

are normalizing functions in which $s_k$ and $t_l$ represent any source word and any target word, which co-occurs with the target word $t_j$ or source word $s_i$, respectively.

To compute the in-domain lexical probability features, $w_{in}(s_i|t_j)$ is substituted for $w(s_i|t_j)$ in Eqn. (2) and $w_{in}(t_j|s_i)$ is substituted for $w(t_j|s_i)$ in Eqn. 3. For example, the forward in-domain lexical probability feature can be computed according to the forward in-domain lexical feature function 30, in Eqn. (9):

$$lex(\bar{s} \mid \bar{t}) = \prod_{i=1}^{n} \frac{1}{|\{j \mid (i,j) \in a\}|} \sum_{(i,j) \in a} \frac{w_{out}(t_j \mid s_i) w_{in}(s_i)}{\sum_k w_{out}(t_j \mid s_k) w_{in}(s_k)} \quad (9)$$

and the reverse in-domain lexical probability feature can be computed according to the reverse lexical feature function 30, Eqn. (10):

$$lex(\bar{t} \mid \bar{s}) = \prod_{j=1}^{n} \frac{1}{|\{i \mid (i,j) \in a\}|} \sum_{(i,j) \in a} \frac{w_{out}(s_i \mid t_j) w_{in}(t_j)}{\sum_l w_{out}(s_i \mid t_l) w_{in}(t_l)} \quad (10)$$

Thus the in-domain lexical probability features are each computed as a function of the respective bilingual word probability extracted from the parallel corpus 46 and also the monolingual word probability extracted from the respective monolingual corpus 38 or 40, over all aligned pairs of words in the source string and candidate text string. Where $\bar{s}$ and $\bar{t}$ are phrases, the values computed according to Eqn. (9) can be aggregated, e.g., summed and normalized, to generate a sentence level lexical feature to use in Eqn. (1), and similarly for Eqn. (10).

These in-domain lexical features can replace the lexical features computed according to Eqns. (2) and (3) or can be used as an additional feature, i.e., the scoring function 48 of Eqn. (1):

$$score = \sum_k \lambda_k \Phi_k(s,t)$$

may take into account four lexical features, two direct (one in-domain, the other out-of-domain) and two corresponding reverse lexical features.

Using the example source string above, the word bank can be translated either by banque or by rive. The translation which is more frequent in the out-of-domain corpus will be promoted in the out-of-domain lexical features computed according to Eqns (2) and (3). By providing non-zero weights to one or both of the in-domain lexical features using in-domain source and target monolingual corpora, the probability distribution is changed in the direction of the translations which are more frequent in the in-domain monolingual corpus.

As will be appreciated, the lexical ambiguity problem can be partly solved when an in-domain language model 70 is integrated in the scoring function.

For example, in addition to the scoring function features above, a language model scoring feature can be incorporated into the overall scoring function. In particular, an exemplary overall scoring function contains an out-of-domain language model together with other feature-functions. $\Phi_k(s,t)$ can thus include the exemplary in-domain features as well as one or more conventional features, such as phrase count, word count, phrasal and lexical probabilities, and distortion features. An exemplary overall scoring function can be represented as:

$$\hat{t} = \operatorname{argmax}_t \lambda_{LM_{out}} \Phi_{LM_{out}}(s,t) + \Sigma_k \lambda_k \Phi_k(s,t), \quad (11)$$

where $\Phi_{LM_{out}}(s,t)$ is the out of domain language model feature and $\lambda_{LM_{out}}$ is its weight and $\Phi_k(s,t)$ does not include a Language model feature.

An in-domain language model feature can be integrated in this baseline scoring function by replacing $\Phi_{LM_{out}}(s,t)$ with $\Phi_{LM_{in}}(s,t)$, an in-domain language model, which leads to the following linear combination:

$$\hat{t} = \operatorname{argmax}_t \lambda_{LM_{in}} \Phi_{LM_{in}}(s,t) + \Sigma_k \lambda_k \Phi_k(s,t), \quad (12)$$

The language model feature can be defined as:

$$\Phi_{LM_{in}}(s,t) = \log p_{in}(t) \quad (13)$$

where $p_{in}(t)$ represents the probability of observing that target language string in a target corpus. This can be computed by any of the methods described above in the background section. For example, a pseudo in-domain target corpus is used in combination with an out-of-domain target corpus for creating an adapted translation model. In practice, smoothing is added to the standard counts to avoid assigning a zero probability to the examples unseen in the training data.

As will be appreciated, an in-domain language model is not sufficient, by itself, to remove translation ambiguity which can occur with domain-specific translation. Using the adapted translation weights (lexical and/or phrasal) may give additional degrees of freedom to the translation model 28. The adapted lexical features can be used as a replacement of the original feature or as additional lexical features that are combined with the out-of-domain lexical features.

In another embodiment, the feature adaptation can also be addressed from a Bayesian perspective. In this embodiment, a prior can be put on the number of times word $s_i$ should be a translation of word $t_j$. Suppose that:

$$s_i | t_j \sim \text{Multinomial}(\theta_j, L_j) \quad (14)$$

$$\theta_j \sim \text{Dirichlet}(\mu c_{in}(s_i)) \quad (15)$$

where $L_j$ is the document length or the total number of occurrences of words in the context of word $t_j$.

$\mu$ is the prior hyperparameter, which can be a fixed value or can be estimated on a small in-domain parallel corpus;

$c_{in}(s_i)$ is the frequency (e.g., number of times, which can be normalized) with which the word $s_i$ occurs in the in-domain monolingual corpus ($w_{in}(s_i) \propto c_{in}(s_i)$).

Then, the posterior probability is simply a Dirichlet($c(s_i, t_j)+\mu s_{in}(s_i)$) where $c(s_i,t_j)$ is the frequency in the parallel corpus, as described above. Taking its expectation leads to adapted lexical weights such as:

$$w_{in}(s_i | t_j) \propto c(s_i, t_j) + \mu c_{in}(s_i) \quad (16)$$

As for the previous method, the forward (reverse) in domain lexical feature can be computed according to Eqn. (9) (Eqn. (10)) as a function of the word frequencies in the out-of-domain corpus and in domain corpus for the respective biphrase and word. As before, a word that is more common in the in-domain collection will have its weight increased.

This approach has some similarity to that of G. Foster, C. Goutte, and R. Kuhn, "Discriminative instance weighting for domain adaptation in statistical machine translation," in Proc. 2010 Conf. on Empirical Methods in Natural Language Processing, EMNLP '10, pp. 451-459. The Bayesian estimation of SMT features in Foster, however is with the prior based on the parallel in-domain corpus and not on a monolingual in-domain corpus as used herein.

2. Phrasal Features

Direct and inverse phrase probabilities $\phi(\bar{s}|\bar{t}), \phi(\bar{t}|\bar{s})$ can also be computed analogously to the lexical features, where $\bar{s}$ and $\bar{t}$ represent a group of source or target words, respectively.

A. Generic Phrasal Feature Functions

Similar to the lexical features, the out-of-domain forward and reverse phrasal features $\text{phr}(\bar{s}|\bar{t})$ and $\text{phr}(\bar{t}|\bar{s})$ are computed based on phrasal probabilities that are estimated on the available parallel corpus 48:

$$\phi(\bar{s} | \bar{t}) = \frac{c(\bar{s}, \bar{t})}{\sum_{\bar{s}} c(\bar{s}, \bar{t})}; \quad (17)$$

and $$\phi(\bar{t} | \bar{s}) = \frac{c(\bar{t}, \bar{s})}{\sum_{\bar{t}} c(\bar{t}, \bar{s})}; \quad (18)$$

where $c(s,t)$ represents the number of times that phrases $\bar{s}$ and $\bar{t}$ co-occur in the parallel corpus 48, and $\Sigma_{\bar{s}} c(\bar{s},\bar{t})$ is a normalizing factor where $\tilde{S}$ represents the source phrases (non-overlapping) which compose the initial source sentence.

B. Domain-Adapted Phrasal Feature Functions

The in-domain forward and reverse phrasal features for inputting to Eqn. (1), (11), or (12) can then be computed according to phrasal feature functions 32 as exemplified in Eqn. (19):

$$\text{phr}_{in}(\bar{s} | \bar{t}) = \frac{\text{phr}_{out}(\bar{t} | \bar{s}) p_{in}(\bar{s})}{\sum_{\bar{s}} \text{phr}_{out}(\bar{t} | \bar{s}) p_{in}(\bar{s})} \quad (19)$$

In another embodiment, the feature adaptation can also be addressed from a Bayesian perspective. In this embodiment, a prior can be put on the number of times phrase $s_i$ should be a translation of phrase $t_j$, in a manner analogous to that described for the lexical features.

As will be appreciated, in-domain phrasal features may not give the same improvement in translation quality as the lexical in-domain features. This is because the phrases themselves give some context to ambiguous words, making erroneous translations less likely. For example, the out-of-domain parallel corpus may have sufficient instances of river bank, rive du fleuve to make this translation reasonably probable, even without the in-domain phrasal features.

3. Other Features: As discussed above, the scoring function can include various other features. As an example, a language model feature may be included. The language model feature may also be based on the monolingual corpus. In particular, the language model 36 estimates how probable the translation t is in the target domain and can be computed as a function of the counts of each biphrase in a pseudo monolingual corpus, which may be derived partly from the parallel corpus (target side) and partly from the monolingual corpus 42. Although domain adaptation in SMT can be performed using solely an in-domain language model, which does not require parallel corpora, such data is often difficult to acquire in sufficient quantity for such a model to be useful.

The language model may help to address the lexical ambiguity problem and to some extent the genre problem. However, in existing systems which attempt to address the problem of lexical ambiguity with the language model only, its value tends to overweight the phrasal and/or lexical feature values, and it may force the decoder to erroneously alter the word order in a way to maximize the value of the language model feature. The translation model 28 is able to cope better with the translation ambiguity relying on the in-domain monolingual corpora. In the exemplary method, in-domain lexical and/or phrasal features are estimated, which can be used to complement a traditional in-domain language model.

A typical language model 36 is an N-gram model, where N is at least 2. The language model estimates the probability of observing any given target language sequence of words, based on the individual probabilities of the N-grams (sequences of N words) that it contains. Language models can be provided for two or more different values of N. While the language model 36 may provide a separate input to the scoring function 34, in one embodiment, it can be used to provide one of its features, together with an associated weight.

Other features which can be incorporated into the scoring function can include a reordering model, and phrase and word penalty features. The reordering model may randomly permute candidate target sentences and the optimal word order can be obtained by maximizing the language model score over all possible permutations. Or, the reordering can evaluate the change in position in the sentence between the source words and their corresponding target words, whereby statistically probable reorderings are favored over improbable ones. While some reordering is expected between languages such as English and French, extensive reordering can be an indication of a poor translation. Such a feature is domain independent. See, for example, U.S. Pub No 20070150257, the disclosure of which is incorporated herein by reference, for other features which may be incorporated.

While Eqn. (1) exemplifies a weighted linear combination (sum) of the features, other scoring functions are also contemplated, which aggregate (e.g., sum or product of) the exemplary features, such as a log-linear function, e.g., of the form:

$$\hat{t} = \mathrm{argmax}_t \frac{1}{Z} \exp \sum_k \lambda_k \Phi_k(s, t)$$

where Z represents a normalizing function.

While the exemplary system and method is described in terms a phrase-based SMT system, it is to be appreciated that it can be also applied to hierarchical SMT and syntax-based SMT systems.

Without intending to limit the scope of the exemplary embodiment, the following examples demonstrate applications of the method.

EXAMPLES

Domain adaptation experiments were performed for English-Spanish and English-French translation models. The experiments were performed in different settings:

1. where no in-domain parallel data is available;
2. where only a small sample (1000 sentences) of in-domain parallel data is available, referred as InTune and used for optimization of the translation models' parameters. It will be appreciated that one thousand sentences is not large enough to train a domain-specific translation model 28 or decoder 22.

In the following experiments, the Europarl corpus is used as a large out-of-domain parallel corpus 48. In order to extend the lexical coverage, it was enriched with parallel data based on Wikipedia titles and Wiktionary entries.

The domain of adaptation selected was the agricultural domain. The in-domain data 46 was extracted from the bibliographical records 40, 42 on agricultural science and technology provided by FAO (called AGRIS) and INRA (for the English-French language pair only) which contain abstracts and titles in different languages. Details on the amount of data available is given in Tables 1 and 2. The alignment in different data sets is given at different levels:

sentence-level for Europarl;
abstract(paragraph)/title for AGRIS and INRA; and
token/title for Wikipedia and Wiktionary.

For this reason it is more correct to compare the amount of the data available on the amount of tokens rather than amount of parallel units. Table 1 summarizes the amount of parallel data available, both in- and out-of-domain. Table 2 summarizes the amount of monolingual data available: the amount of non-parallel data per dataset is given explicitly (AGRIS/INRA titles/abstracts), the row Total Monolingual IN gives the total amount of in-domain data (equal to sum of all parallel and non-parallel in-domain tokens) which is used for domain adaptation experiments.

TABLE 1

Summary of parallel data available

| Data set | Nb of parallel units | Nb tokens En | Nb tokens Es/Fr |
|---|---|---|---|
| English-Spanish | | | |
| IN: AGRIS abstracts | 3385 | 492168 | 567433 |
| IN: AGRIS titles | 37572 | 441293 | 518057 |

TABLE 1-continued

Summary of parallel data available

| Data set | Nb of parallel units | Nb tokens En | Nb tokens Es/Fr |
|---|---|---|---|
| IN: JRC-Aquis-IN | 128796 | 3438003 | 3877348 |
| OUT: Europarl | 1258778 | 31755474 | 33066882 |
| OUT: Wikipedia + Wiktionary | 366040 | 967367 | 1018937 |
| English-French | | | |
| IN: INRA abstracts | 2002 | 368795 | 395604 |
| IN: INRA titles | 11172 | 142316 | 165758 |
| IN: AGRIS titles | 29368 | 34318 | 395416 |
| IN: JRC-Aquis-IN | 129399 | 3457039 | 3743797 |
| OUT: Europarl | 1288074 | 32646149 | 33906029 |
| OUT: Wikipedia + Wiktionary | 488379 | 1268293 | 1319063 |

TABLE 2

Summary of monolingual data available

| Data set | Nb units En | Nb tokens En | Nb units Es/Fr | Nb tokens Es/Fr |
|---|---|---|---|---|
| English-Spanish | | | | |
| AGRIS abstracts | 477336 | 65540602 | 28715 | 4396123 |
| AGRIS titles | 2443846 | 29951821 | 26922 | 340867 |
| Total Monolingual IN | 99.8M tokens | | 9.7M tokens | |
| English-French | | | | |
| INRA abstracts | 26 | 3333 | 46 | 10691 |
| INRA titles | 59 | 85 | 788 | 1070 |
| AGRIS titles | 2452050 | 30049925 | 3963 | 56788 |
| AGRIS abstracts | 480295 | 65987675 | 28311 | 3595287 |
| Total Monolingual IN | 100M tokens | | 8.4M tokens | |

The models were tested on the test sets extracted either from AGRIS or INRA corpus. A sample of metadata records extracted from Organic.Edunet portal (OL) for English-Spanish language pair was also available. Table 3 provides the main statistics for these different test sets.

TABLE 3

Statistics for the test sets

| Test set | Nb units | Nb tokens En | Nb tokens Es/Fr |
|---|---|---|---|
| English-Spanish | | | |
| OL | 608 | 4418 | 5388 |
| AGRIS | 2000 | 22529 | 28030 |
| English-French | | | |
| INRA | 2000 | 24207 | 31888 |
| AGRIS | 2000 | 23888 | 30786 |

Each of the translation models were evaluated using the BLEU and TER MT evaluation metrics: The value of BLEU is in the [0,1]-range, and it is the average precision based on the n-grams which are common to the reference translation and the MT-produced translations. Thus, higher BLEU corresponds to higher similarity (meaning a "better" translation). TER (Translation Error Rate) is also in the [0,1]-range and is related to the number of edits that are needed in order to transform the MT translation into a valid human-produced translation. Thus, lower TER value corresponds to a better translation.

Tables 4 and 5 show the results of the experiments for English-Spanish and English-French models, respectively. The first part of the table corresponds to the case when no parallel data is available. In this case, the feature weights learned on a Europarl development (tuning) set provided by the ACL 2008 WORKSHOP ON STATISTICAL MACHINE TRANSLATION are used, while in the second part of the table, the tuning is performed using the in-domain parallel tuning set of 1000 sentences. Different standard and adaptation techniques were evaluated:

1. No Domain Adaptation: A standard SMT system was used, with an out-of-domain (generic) language model.

2. Baseline: As for 1, but with a target monolingual corpus 42 used for language model 36 training only.

3. Baseline+InLex: As for 2, but with generic lexical probabilities replaced by the adapted lexical probabilities, according to the method described above, i.e., the lexical features are computed using Eqns. (9) and (10). Out-of-domain phrasal features were also used.

4. Baseline+InOutLex: As for 4, but with the adapted lexical probabilities added as extra features in the translation model, i.e., both in-domain and out-of-domain lexical features. Thus, the scoring function uses the four lexical features computed according to Eqns. (2), (3), (9), and (10). When there is no tuning of the feature weights with a parallel in domain corpus, the weights of the lexical probabilities (learned on the Europarl development set) are split between in-domain and out-of-domain lexical features in the following way: the direct lexical probabilities (in and out) are weighted with feature weights corresponding to $\lambda_{lexDir}/2$ and the reverse lexical probabilities are weighted with $\lambda_{lexRev}/2$; i.e., the weights are equally split between in-domain and out-of-domain lexical features.

5. Baseline+InOutPhT+InOutLex: in addition to the updated and standard lexical probabilities of method 4, the reverse phrasal probabilities $\phi(\bar{t}|\bar{s})$ are also updated, and the in-domain phrasal feature computed according to Eqn. (19). As for the lexical weights, the feature weight $\lambda_{phRev}$ is divided between in-domain and out-of-domain phrasal probabilities when no tuning is performed.

In Tables 4 and 5, the exemplary domain adaptation methods are compared to the case when the monolingual corpus is used for language model 36 training only (Baseline Domain Adaptation). Both tables show that significant gains can be obtained, compared to the standard monolingual domain adaptation (up to 1 BLEU point and 2.5 TER points). Overall, the TER metrics is always lower (better) than the baseline for domain adaptation and the BLEU is improved in most cases. It is to be noted that that the size of the French monolingual corpus is smaller than the Spanish monolingual corpus, which may explain the smaller gains for English-French experiments.

TABLE 4

Results on domain adaptation for English-Spanish

| | OL | | AGRIS | |
|---|---|---|---|---|
| model | BLEU | TER | BLEU | TER |
| No domain adaptation | 0.2702 | 0.6564 | 0.2764 | 0.6314 |
| No parallel in-domain data | | | | |
| Baseline Domain Adaptation | 0.3097 | 0.6007 | 0.38 | 0.5377 |
| Baseline + InLex | 0.311 | 0.5711 | 0.3927 | 0.5135 |
| Baseline + InOutLex | 0.3172 | 0.5787 | 0.3982 | 0.5173 |
| Baseline + InOutPhT + InOutLex | 0.3125 | 0.5783 | 0.3933 | 0.5195 |
| In-domain tuning | | | | |
| Baseline Domain Adaptation | 0.3144 | 0.594 | 0.3969 | 0.5199 |
| Baseline + InLex | 0.3078 | 0.5966 | 0.404 | 0.5128 |
| Baseline + InOutLex | 0.3164 | 0.5892 | 0.4015 | 0.5153 |
| Baseline + InOutPhT + InOutLex | 0.3242 | 0.5926 | 0.4015 | 0.5147 |

TABLE 5

Results on domain adaptation for English-French

| | INRA | | AGRIS | |
|---|---|---|---|---|
| model | BLEU | TER | BLEU | TER |
| No Domain Adaptation | 0.1492 | 0.7619 | 0.2069 | 0.7681 |
| No parallel in-domain data | | | | |
| Baseline Domain Adaptation | 0.2058 | 0.7059 | 0.2614 | 0.7151 |
| Baseline + InLex | 0.2033 | 0.6971 | 0.2684 | 0.7057 |
| Baseline + InOutLex | 0.2045 | 0.7008 | 0.2646 | 0.7095 |
| Baseline + InOutPhT + InOutLex | 0.2009 | 0.7014 | 0.2629 | 0.7077 |
| In-domain tuning | | | | |
| Baseline Domain Adaptation | 0.2011 | 0.6997 | 0.2573 | 0.7065 |
| Baseline + InLex | 0.2002 | 0.6986 | 0.257 | 0.7071 |
| Baseline + InOutLex | 0.1984 | 0.6989 | 0.2536 | 0.7077 |
| Baseline + InOutPhT + InOutLex | 0.2028 | 0.6984 | 0.2574 | 0.7053 |

Table 6 gives some examples of improvements which may be obtained with the exemplary adaptation technique. As mentioned above, an in-domain language model (Baseline DA) is able, by itself, to deal with the lexical ambiguity problem to some extent. However, when it is only the language model that is responsible for this disambiguation task, the translation model may give it too much weight, which may lead to the erroneous reordering observed in Example 2 of Table 6, or force it to omit words, as in Example 1 of Table 6 (higher plants is translated simply to plantes).

TABLE 6

Some examples of domain adaptation for English-French

Example 1

| | |
|---|---|
| Source | Study of glutathione peroxydases (GPX) in higher plants: role in stress response |
| Baseline DA | Étude des peroxydases Glutathion (gpx) des plantes: réponse au stress |
| Baseline DA + InOutLex | Étude du Glutathion peroxydases (gpx) de plantes supérieurs. Réponse au stress |

Example 2

| | |
|---|---|
| Source | Oil palm seed distribution |
| Baseline DA | Palmier à huile distribution de semences |
| Baseline DA + InOutLex | Distribution de graines de palmier à huile |

Example 3

| | |
|---|---|
| Source 3 | Mediterranean livestock production: uncertainities and opportunities. 2nd Seminar of the Scientific and Professional Network on Mediterranean Livestock Farming |

TABLE 6-continued

Some examples of domain adaptation for English-French

| | |
|---|---|
| Baseline DA | L'élevage méditerranéen: Uncertainities et des chances. 2nd. Colloque scientifique et professionnelle des réseaux d'élevage méditerranéen |
| Baseline DA + InOutLex | L'élevage méditerranéen: Uncertainities et des chances. 2nd seminaire du réseau professionnel et scientifique sur l'élevage mediterranéen |

The exemplary method yields significant improvement in BLEU and TER measures. These are evident even when no in-domain parallel corpus is available.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A translation method adapted to a domain of interest comprising:
receiving a source text string comprising a sequence of source words in a source language;
generating a set of candidate translations of the source text string, each candidate translation comprising a sequence of target words in a target language; and
with a processor, identifying an optimal translation from the set of candidate translations as a function of at least one domain-adapted feature, the at least one domain-adapted feature being computed based on:
bilingual probabilities, each bilingual probability being for a source text fragment and a target text fragment of the source text string and candidate translation respectively, the bilingual probabilities being estimated on an out-of-domain parallel corpus comprising source and target strings; and
monolingual probabilities for text fragments of one of the source text string and candidate translation, the monolingual probabilities being estimated on an in-domain monolingual corpus,
wherein the domain-adapted feature comprises at least one of:
a) a forward domain-adapted lexical feature which is a function of $$\sum_{(i,j)\in a} w_{in}(s_i \mid t_j)$$

where $w_{in}(s_i|t_j)$ is an adapted word probability and is a function of a product of $w_{out}(t_j|s_i)$ and $w_{in}(s_i)$;

b) a reverse domain-adapted lexical feature which is a function of $$\sum_{(i,j)\in a} w_{in}(t_j \mid s_i)$$

where $w_{in}(t_j|s_i)$ is an adapted word probability and is a function of a product of $w_{out}(t_j|s_i)$ and $w_{in}(t_j)$;

c) a forward domain-adapted phrasal feature which is a function of:

$$\sum_{(i,j)\in a} phr_{in}(\bar{s}_i \mid \bar{t}_j),$$

where $phr_{in}(\bar{s}_i|\bar{t}_j)$ is an adapted phrase probability and is a function of a product of $phr_{out}(\bar{t}_j|\bar{s}_i)$ and $p_{in}(\bar{s}_i)$;

d) a reverse domain-adapted phrasal feature which is a function of:

$$\sum_{(i,j)\in a} phr_{in}(\bar{t}_j \mid \bar{s}_i),$$

where $phr_{in}(\bar{t}_j|\bar{s}_i)$ is an adapted phrase probability and is a function of a product of $phr_{out}(\bar{s}_i|\bar{t}_j)$ and $p_{in}(\bar{t}_j)$;

where $s_i$ and $t_j$ represent words of the source string and candidate translation respectively which are aligned in an alignment α of the source string and candidate translation, $w_{out}(t_j|s_i)$ represents the bilingual probability, which is a word probability for target word $t_j$ in the presence of source word $s_i$, derived from the parallel corpus, and $w_{in}(s_i)$ represents the monolingual probability, which is the word probability for source word $s_i$ derived from the in-domain monolingual corpus;

$\bar{s}_i$ and $\bar{t}_j$ represent phrases of the source string and candidate translation respectively which are aligned in the alignment α of the source string and candidate translation, $phr_{out}(\bar{t}_j|\bar{s}_i)$ represents the bilingual probability, which is a phrasal probability for target phrase $\bar{t}_j$ in the presence of source phrase $\bar{s}_i$, derived from the parallel corpus, $p_{in}(\bar{s}_i)$ represents the monolingual probability, which is the phrasal probability for source phrase $\bar{s}_i$ derived from the in-domain monolingual corpus, and $p_{in}(\bar{t}_j)$ represents the monolingual probability, which is the phrasal probability for target phrase $\bar{t}_j$ derived from the in-domain monolingual corpus.

2. The method of claim 1 wherein the domain-adapted feature comprises at least one of:
a domain-adapted lexical feature; and
a domain-adapted phrasal feature.

3. The method of claim 2, wherein the domain-adapted feature comprises at least one domain-adapted lexical feature and wherein the domain-adapted lexical feature is computed as a function of a parallel word probability and a monolingual word probability for each of a plurality of the words of one of the source text string and the target text string,
each parallel word probability being a function of co-occurrence, in the parallel corpus of source and target strings, of that word with a corresponding word of the other of the source text string and target text string,
each monolingual word probability being a function of the occurrence of that word in the monolingual corpus.

4. The method of claim 2, wherein the domain-adapted feature comprises at least one domain-adapted phrasal feature and wherein the domain-adapted phrasal feature is computed as a function of a parallel phrase probability and a monolingual phrase probability for each of a plurality of phrases of one of the source text string and the target text string,
each parallel phrase probability being a function of co-occurrence, in a parallel corpus of source and target strings, of that phrase with a corresponding phrase of the other of the source text string and target text string, each monolingual phrase probability being a function of the occurrence of that phrase in a respective monolingual corpus.

5. The method of claim 4, wherein each of the plurality of phrases is in a biphrase which includes a source phrase and a target phrase, the method further comprising retrieving a set of the biphrases from a biphrase library such that each word of the source text string is covered by no more than one of the retrieved biphrases, and wherein the corresponding phrase is a phrase from the same biphrase.

6. The method of claim 2, wherein the domain-adapted feature comprises direct and reverse domain-adapted lexical features.

7. The method of claim 2, wherein the domain-adapted feature comprises direct and reverse domain-adapted phrasal features.

8. The method of claim 1, wherein the identifying of the optimal translation comprises computing a scoring function in which each of a plurality of features is weighted by a respective weight and wherein the plurality of features comprises the at least one domain-adapted feature.

9. The method of claim 8, wherein the plurality of features further comprises at least one of a lexical and phrasal out-of-domain feature, the at least one out-of-domain feature being computed based on parallel probabilities derived from the parallel corpus and which is independent of the monolingual probabilities derived from the in-domain monolingual corpus.

10. The method of claim 1, further comprising learning the weight for the at least one domain-adapted feature using an in-domain parallel corpus different from the out-of-domain parallel corpus used to compute the bilingual probabilities.

11. The method of claim 1, wherein the in-domain monolingual corpus comprises at least one of:
a first in-domain monolingual corpus which comprises text strings in the source language having no corresponding text strings in the target language; and
a second in-domain monolingual corpus which comprises text strings in the target language having no corresponding text strings in the source language.

12. The method of claim 11, wherein the in-domain monolingual corpus comprises the first in-domain monolingual.

13. The method of claim 1, wherein the scoring function has the general form:

$$\text{score} = \sum_k \lambda_k \Phi_k(s, t) \quad (1)$$

where k is at least two;
$\Phi_k$ represent the features, at least one of which is the in-domain feature; and
$\lambda_k$ represent the weights, at least one of which is the weight for the in-domain feature.

14. The method of claim 1, wherein the bilingual probabilities derived from the parallel corpus are stored in a biphrase library and wherein the monolingual probabilities are stored only for text fragments found in the biphrase library.

15. The method of claim 1, wherein the parallel corpus comprises translations pairs, each translation pair comprising a source text string comprising words in the source language and a target text string comprising words in the target language, one of the source and target text strings having been determined to be a translation of the other.

16. The method of claim 1, wherein the bilingual probabilities each express the probability of finding a source text fragment of the source text string in the presence of a target text fragment of the candidate translation, or vice versa, in a translation pair of the sentences in the parallel corpus.

17. The method of claim 1, further comprising outputting the optimal translation as the translation of the source string.

18. A computer program product comprising a non-transitory recording medium storing instructions, which when executed on a computer causes the computer to perform the method of claim 1.

19. A system comprising memory which stores instructions for performing the method of claim 1 and a processor in communication with the memory for executing the instructions.

20. The method of claim 1, wherein in computing the domain-adapted feature, $$w_{in}(s_i \mid t_j) = \frac{w_{out}(t_j \mid s_i) w_{in}(s_i)}{\sum_{s_k} w_{out}(t_j \mid s_k) w_{in}(s_k)}, \text{ or} \quad (7)$$

$$w_{in}(t_j \mid s_i) = \frac{w_{out}(s_i \mid t_j) w_{in}(t_j)}{\sum_{t_l} w_{out}(s_i \mid t_l) w_{in}(t_l)}, \quad (8)$$

where $$\sum_k w_{out}(t_j \mid s_k) w_{in}(s_k)$$

and $$\sum_l w_{out}(s_i \mid t_l) w_{in}(t_l)$$

are normalizing functions.

21. A translation system adapted to a domain of interest comprising:
memory which stores:
a bilingual probability for each of a set of biphrases estimated on an associated out-of-domain parallel corpus comprising source and target strings, each biphrase comprising a text fragment in the source language and a text fragment in a target language; and
a monolingual probability for each of a set of text fragments estimated on an associated in-domain monolingual corpus, each of the text fragments occurring in at least one of the biphrases in the set of biphrases;
memory which stores:
a candidate translation generator for generating a set of candidate translations of a source text string, the source string comprising a sequence of source words in a source language, each candidate translation comprising a sequence of target words in a target language;
a translation evaluation component for identifying an optimal translation from the set of candidate translations as a function of at least one domain-adapted feature, the at least one domain-adapted feature being computed based on:
the respective bilingual probabilities for the source and target text fragments of the source text string and candidate translation, and
the respective monolingual probabilities for text fragments of at least one of the source text string and candidate translation, the domain adapted feature comprising at least one domain adapted lexical feature selected from:

$$lex(\bar{s}|\bar{t}) = \prod_{i=1}^{n} \frac{1}{|\{j \mid (i,j) \in a\}|} \sum_{(i,j) \in a} \frac{w_{out}(t_j|s_i)w_{in}(s_i)}{\sum_k w_{out}(t_j|s_k)w_{in}(s_k)}; \quad (9)$$

and $$lex(\bar{t}|\bar{s}) = \prod_{j=1}^{n} \frac{1}{|\{i \mid (i,j) \in a\}|} \sum_{(i,j) \in a} \frac{w_{out}(s_i|t_j)w_{in}(t_j)}{\sum_l w_{out}(s_i|t_l)w_{in}(t_l)}; \quad (10)$$

and a processor which executes the instructions.

22. The system of claim 21, further comprising an in domain language model stored in memory, the translation evaluation component identifying an optimal translation based also on the language model.

23. A method for adapting a machine translation system for a domain of interest, comprising:
providing a biphrase library comprising a set of biphrases, each biphrase comprising a source text fragment in a source language and a target text fragment in a target language, the biphrases being associated with bilingual probabilities estimated on a parallel corpus of text strings in the source and target languages;
providing a first monolingual corpus for the domain of interest comprising text strings in one of the source language and target language;
computing a monolingual text fragment probability for each of a set of text fragments found in the biphrase library in the one of the source language and target language, estimated on the first monolingual corpus;
generating weights for features of a scoring function, at least one of the features being a domain-adapted feature that is to be computed based on a sum, over each aligned pair of a source fragment of a source text string and a target text fragment of a candidate translation, of product of:
 a bilingual probability retrieved from the biphrase library, the bilingual probability being for the respective source and target text fragments; and
 a monolingual probability for the respective text fragments of one of the source text string and the candidate translation.

24. The method of claim 23, further comprising:
providing a second monolingual corpus for the domain of interest comprising text strings in another of the source language and target language; and
computing a monolingual text fragment probability for each of a set of text fragments found in the biphrase library in the other of the source language and target language, based on the second monolingual corpus.

* * * * *